(12) United States Patent
Clark

(10) Patent No.: US 7,159,231 B1
(45) Date of Patent: Jan. 2, 2007

(54) INTERMISSION CONTENT

(75) Inventor: James Allen Clark, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 1126 days.

(21) Appl. No.: 09/921,258

(22) Filed: Aug. 1, 2001

(51) Int. Cl.
H04N 7/10 (2006.01)
H04N 5/545 (2006.01)
H04N 7/173 (2006.01)

(52) U.S. Cl. .......................... 725/36; 725/42; 725/111; 725/112

(58) Field of Classification Search .................. 725/31, 725/32, 36, 42, 111, 112; 709/217–219
See application file for complete search history.

(56) References Cited

U.S. PATENT DOCUMENTS 6,637,030 B1 * 10/2003 Klein ........................... 725/78
7,013,000 B1 * 3/2006 Bortolini et al. .......... 379/93.05
2002/0083438 A1 * 6/2002 So et al. ........................ 725/31
2002/0100041 A1 * 7/2002 Rosenberg et al. ........... 725/32
2002/0144262 A1 * 10/2002 Plotnick et al. ............... 725/32

* cited by examiner

Primary Examiner—Kieu-Oanh Bui
(74) Attorney, Agent, or Firm—Marger Johnson & McCollom, PC

(57) ABSTRACT

Method and apparatus to provide alternative content during an intermission in a main content experience. The method includes receiving a pause signal and starting a pause interval. When the pause interval exceeds a predetermined length, alternative content is provided to the user. A network termination unit receives the pause signal and includes a controller that ceases distribution of the main content and starts a timer to time the pause interval. The network termination unit has a content source that may include a local store of main content, alternative content, or both. It may also include a port operable to pull content from a content server.

18 Claims, 2 Drawing Sheets

INTERMISSION CONTENT

BACKGROUND

1. Field

This disclosure relates to personal video recorders, more particularly to centralized personal video recorders and any intermission periods.

2. Background

Personal video recorders allow consumers to adjust the viewing schedule of desired programs and other shows, referred to here as content. Consumers can watch their desired content when they want, not when the content providers decide to provide it. An additional feature of these recorders allows the consumers to skip or delete any commercials or any other interruptions in a particular program.

These personal video recorders may include videocassette recorders, set top boxes with video recording capabilities, or other types of solid-state recorders, such as the TiVO system. An additional advantage of solid-state recorders, to most consumers' viewpoints, is the ability to remove commercials. Some of these recorders can even be programmed to proactively skip recording of the commercials, or can be programmed to identify and delete the data associated with the commercials.

While consumers view the ability to skip commercials as an advantage, service providers generally do not. As used here, content providers refers to those entities that provide the actual programming, such as television shows, movies, concerts, music, etc. Service providers generally provide the connection, the distribution and delivery service, and account maintenance for the consumers, etc. Service providers may also be content providers, and content providers may also be service providers, but generally service providers are of interest here.

Service providers have become interested in providing centralized personal video recording services to their end users, or consumers. For example, a consumer may interact with their video system to order a pay-per-view movie. Similarly, a consumer may inform the service provider that it wants to record a movie that will be played on a channel to which the consumer subscribes. Later, the consumer will interact with the system to direct it to play the movie, similar to pay-per-view or video-on-demand.

However, service providers make a good deal of their revenues on advertising. Providing a centralized recording service to which consumers will subscribe will require the ability to skip commercials. Service providers then may be put in the position of providing a service that reduces their advertising income. Therefore, other ways to provide advertising opportunities to providers of a centralized video recording service would be useful.

SUMMARY

One aspect of the disclosure is a method for providing alternative content during intermissions. The method includes receiving a pause signal and starting a pause interval. When the pause interval exceeds a predetermined length, alternative content is provided to the user.

Another aspect of the disclosure is a network termination unit receives the pause signal and includes a controller that ceases distribution of the main content and starts a timer to time the pause interval. The network termination unit has a content source that may include a local store of main content, alternative content, or both. It may also include a port operable to pull content from a content server.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
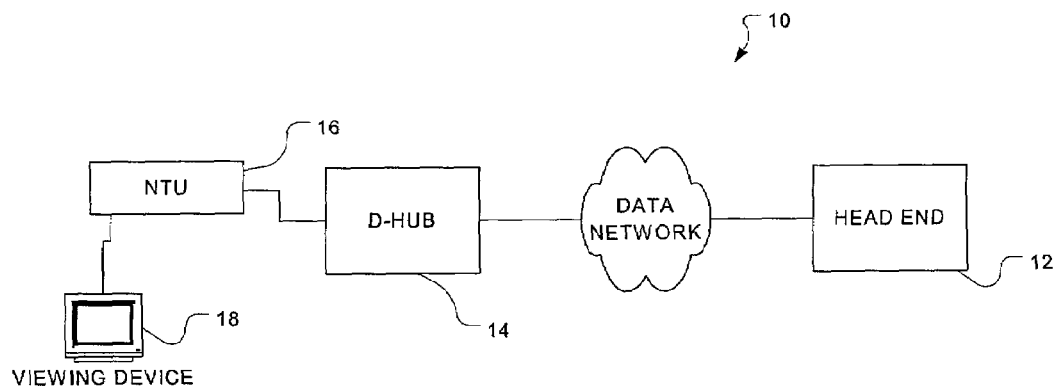
FIG. 1 shows one embodiment of a video content delivery system, in accordance with the invention.

An embodiment of a video distribution network 10 in accordance with the invention is shown in FIG. 1. A regional distribution center 12, referred to as the head end, receives a set of programs in MPEG format. The head-end 12 then breaks up these programs into network packets, for example IP packets. The term packet as used here includes frame relay network frames, as well as packets for asynchronous transfer mode networks.

The resulting packets are then place on the network between the head end and the distribution hub 14. The distribution hub then reconstructs the programs from the packets, using the characteristics of the packets defined by the network standard. For example, packets across an IP network typically have a timestamp in the header that allows the packets to be reordered into their proper order. The distribution hub then reassembles the program data from the packets, removing the encapsulation and reconstructing the programs.

Once reconstructed, the distribution hub 14 then converts the programs into radio frequency (RF) signals for transmission across a coaxial cable network to the cable subscribers. The RF signals are typically decoded and converted to display and audio signals by a network termination unit, or NTU 16. The NTU 16 decodes and converts the signals into the display format necessary for the associated viewing device 18. If the viewing device 18 were a television, for example, the NTU would be a set-top box. If the viewing device 18 were a personal computer or other computing device, the NTU would be a cable modem. Note that the term computing device, as used here, is any device that receives signals from a cable modem and converts them into viewable format.

Users may use the video distribution network in several ways. For example, a user may use a personal video recorder, either centralized or local, through the NTU to record a program. Alternatively, the user may order a video on demand program, or have recorded a concert. Note that in the case of a concert, as well as other types of programs, the user may not actually 'view' the content, but will listen to it. As used here, the term 'experience' will refer to the user's interaction with the content.

In either case, the user will experience the ordered content at some point, such as through video on demand or playback of the recorded program. During the course of the program the user may pause the delivery of the main content. This pause interval, or intermission, may be for a brief moment or for an extended period. It must be noted that the program is paused. The user did not stop viewing the main content in order to view some other content, by changing channels or stopping the playback. It is possible to put this pause time to use as a way to deliver alternative content, such as advertisements or music, among others.

Figure 2:
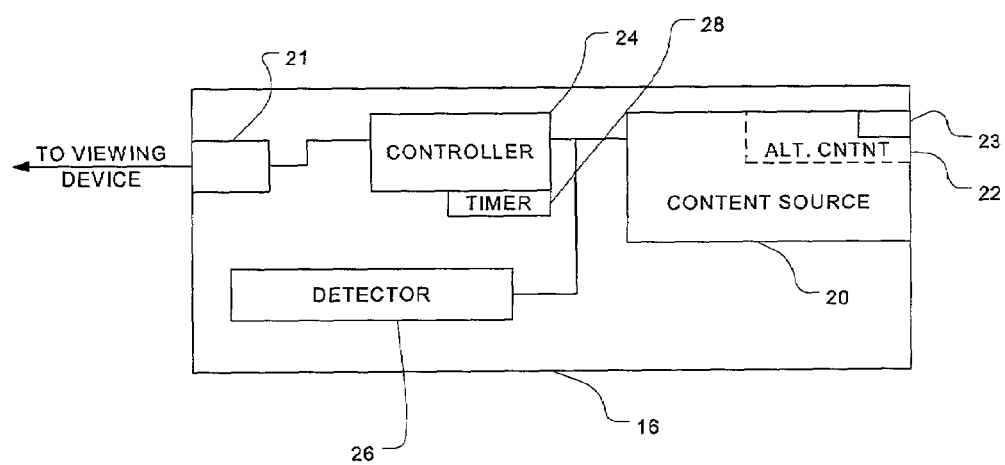
FIG. 2 shows one embodiment of a network termination unit, in accordance with the invention.

One example of an NTU 16 with the capability of utilizing the pause intervals is shown in more detail in FIG. 2. The NTU 16 has a port 23 through which the NTU receives the main content, such as a television program. Port 23 is part of a larger component of the NTU that provides content, the content source 20. Content source 20 may also have a store of alternative content 22, as will be discussed in more detail later.

Controller 24 handles access to the content. The controller 24 may be a microcontroller, digital signal processor or a central processing unit, among other types of processors. The controller determines what content, if any, is sent through the adapter 21 that allows audio and/or video content to be distributed to the user. In the example above, where a user pauses the playing of the program, the pause command signal is received and detected by the detector 26. The detector is capable of receiving many different kinds of command signals, one of which is a pause signal. The actual determination as to the nature of the command signal may be determined by the controller, or may be determined by the detector or another circuit. The choice is left up to the system designer.

In the example above, the user sends a pause signal to the NTU. The NTU then ceases distribution of the main content. Additionally, a timer is initiated at the reception of the pause signal, timing the length of the pause interval or intermission. When the intermission exceeds a predetermined time threshold, the controller may access alternative content and distribute that to the user.

As mentioned previously, the alternative content may be from a local store on the NTU, such as that shown in 22. This local store may be updated with downloads from the D-HUB, or just programmed into the NTU during manufacture. Both the alternative content and the main content may be locally stored or remotely stored individually.

For example, the NTU may have a personal video recorder that stores recorded content locally. When the pause interval exceeds the predetermined time, the content source may pull alternative content from a local store, or may receive it from the port 23 as part of the content source. Similarly, if the main content is something similar to video on demand, or the service provider offers a centralized personal video recording service, the main content may come from a remote source such as the D-HUB through port 23. The alternative content may also be from a remote source as well as from a local store. In the example of both the main and alternative content coming from a remote source, the content source 20 would primarily comprise the port 23 and any associated communications circuitry.

In the case of a remote source of either main or alternative content, the source could be located in one or more of several places in the video distribution network of FIG. 1. For example, either or both could reside at the D-HUB, either or both may reside somewhere else in the data network, or either or both could reside at the head end. For purposes of this discussion, the remote source will be referred to a content server, with no intention of limiting the actual remote source to a specific server configuration.

Figure 3:
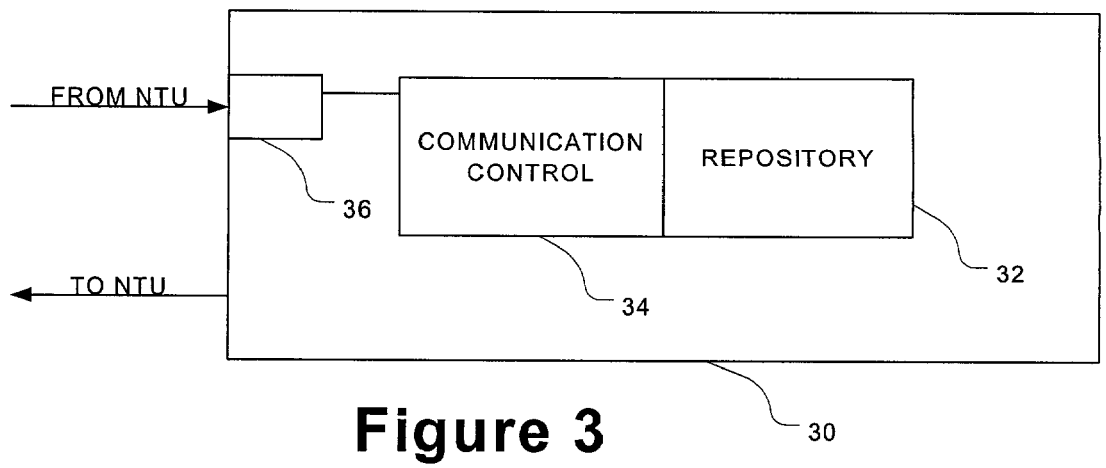
FIG. 3 shows one embodiment of a video content server, in accordance with the invention.

An example of a content server 30 is shown in FIG. 3. A port 36 receives information from an NTU. The information may be a request for video on demand, a pause command, a playback command in the case of a centralized recording service, etc. This information will probably be packetized and will need to be de-packetized and analyzed by the communication control 34. The information may include the current show being viewed by the user, and any user preferences as to the alternative source of content, as will be discussed further. Alternatively, either or both of this type of information may be predefined by the user or determined from the outgoing stream of main content, and stored at the content server.

The communication control 34 would then access the content desired from the repository 32. The repository could store recorded programs, licensed programs to be made available as video on demand, music, advertising, etc. The communication control would determine what the desired content is from the repository and access it. The desired content would then be sent to the NTU, either through the same port 36, or possibly through a second port. In the case of the information received being a pause signal, the content server would access the alternative content and send it to the NTU.

The user may be offered several different options as to the alternative content. The user may specify the length of the intermission period prior to the appearance of alternative content, whether or not to receive alternative content, as well as the source of the content, such as music, advertisements, specific kinds of advertisements, movie trailers, etc. In one embodiment, the controller would present a user interface to the user, such as a series of menus from which the user could make selections. If the NTU were a set-top box, for example, the user could make selections with the remote control. As mentioned previously, these user preferences could be stored in the content server for future use, or provided in real-time during the start of an intermission period. In some embodiments, it may even be desirable to store the preferences with user names, allowing the controller to ask for a user identity, either at the start of the main content, or during the intermission.

Figure 4:
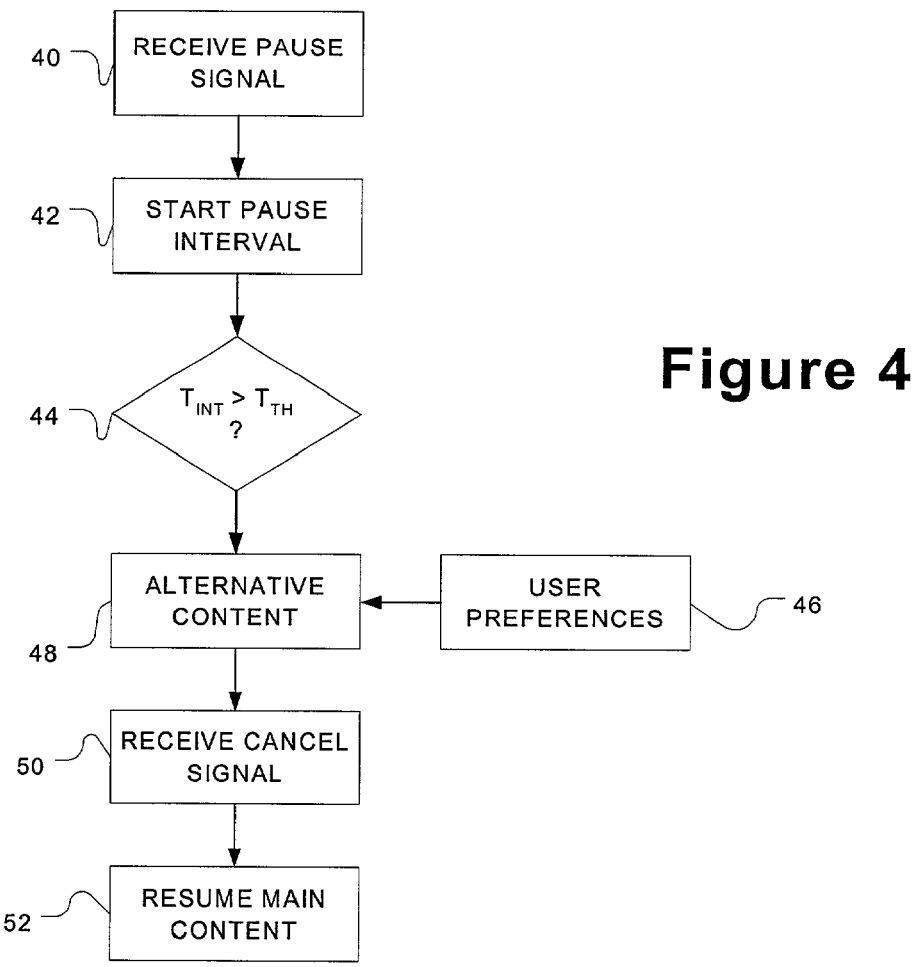
FIG. 4 shows one embodiment of a method to provide alternative content to viewers, in accordance with the invention.

However, the allowance for user preferences is optional. This can be seen by one embodiment of a method to provide alternative content during a pause interval as shown in the flowchart of FIG. 4. The pause signal is received at 40. As mentioned previously, this process may occur at the NTU or at a content server. The pause interval is started at 42, which will typically involve initiation of a timer. When the elapsed time of the pause interval, $T_{INT}$ becomes greater than a predefined threshold time, $T_{TH}$, alternative content is provided at 48. Note that the threshold time may be predetermined by user preferences, or predetermined at the time of the sending of the pause signal. In either case, the threshold time is determined prior to the checking of the threshold time against the interval time. As mentioned previously, the alternative content provided at 48 may be determined by user preferences selected at 46.

At some point, the user may cancel the pause interval. The cancel signal may be a second pressing of the pause button, or a pressing of the play button, as examples. It is received at 50. At 52, the network termination unit resumes distribution of the main content.

In one embodiment, this provision of alternative content can interact with an application that tracks viewing usage and content selections, disclosed in U.S. patent application Ser. No. 09/864,360, filed May 23, 2001, entitled "Content Discovery and Differential Advertising in Video Distribution Networks." Generally, a background program, such as an applet, acts as a source of information about the content being experienced by the user at the NTU's network location. The NTU can act as an awareness trigger by placing an indicator in a packet about the content it is currently viewing. Using embodiments of the current invention, the content controller could sense these packets and tell the NTUS viewing video on demand or recorded programs to load the alternative content based upon the indicators. When an intermission occurs, the alternative content is then provided, based upon user preferences, a predetermined selection or even based upon the content currently being viewed as main content as designated by the indicators.

In this manner, a method and apparatus are provided that allow service providers to continue to get advertising opportunities, and users to view alternative content when unable to view main content.

Thus, although there has been described to this point a particular embodiment for a method and apparatus for alternative content distribution in a video distribution network, it is not intended that such specific references be considered as limitations upon the scope of this invention except in-so-far as set forth in the following claims.

What is claimed is:

1. A network termination unit, comprising:
   a port to connect the unit to a cable network;
   a detector to detect received signals from a user and to determine when the received signals include a pause signal;
   a timer to time a pause interval initiated at reception of the pause signal;
   a source of alternative content, wherein the alternative content is selected from the group comprising: music, advertisements, movie trailers, video on demand, and recorded programs; and
   a controller to:
      control access to content;
      insert an indicator describing the content in packets containing the content; and
      provide alternative content to the viewer when the pause interval exceeds a predetermined time period.

2. The network termination unit as claimed in claim 1, wherein the network termination unit comprises one of a digital video recorder or a cable modem.

3. The network termination unit as claimed in claim 1, wherein the controller comprises one of a processor or a microcontroller.

4. The network termination unit as claimed in claim 1, wherein the controller and timer are provided by a central processing unit.

5. The network termination unit as claimed in claim 1, wherein the source of alternative content comprises one of a memory located in the network termination unit or a connection to a remote server on the cable network.

6. The network termination unit as claimed in claim 1, wherein a selection of the source of alternative content is programmable by the user.

7. The network termination unit as claimed in claim 1, the controller to provide alternative content further to provide alternative content based upon one of user preferences, a predetermined selection, and the content being viewed as indicated by the indicators.

8. A network termination unit, comprising:
   a means for connecting the unit to a cable network;
   a means for detecting received signals from a user and to determine when the received signals include a pause signal;
   a means for timing a pause interval initiated at reception of the pause signal;
   a means for providing alternative content, wherein the alternative content is selected from the group comprising: music, advertisements, movie trailers, video on demand, and recorded programs; and
   a means for:
      controlling access to content;
      inserting an indicator describing the content in packets containing the content; and
      providing alternative content to the viewer when the pause interval exceeds a predetermined time period.

9. The network termination unit as claimed in claim 8, wherein the network termination unit comprises one of a digital video recorder or a cable modem.

10. The network termination unit as claimed in claim 8, wherein the means for controlling comprises one of a processor or a microcontroller.

11. The network termination unit as claimed in claim 8, wherein the means for controlling and the means for timing are provided by a central processing unit.

12. The network termination unit as claimed in claim 8, wherein the means for providing alternative content comprises one of a memory located in the network termination unit or a connection to a remote server.

13. The network termination unit as claimed in claim 8, the means for providing alternative content further for providing alternative content based upon one of user preferences, a predetermined selection, and the content being viewed as indicated by the indicators.

14. A method of providing content to a user, comprising:
   providing main content to a user through a viewing device;
   inserting indicators in packets containing the content, wherein the indicators provide information about the content;
   receiving a pause signal from the user;
   starting a timer to time a pause interval;
   accessing a source of alternative content based upon one of user preferences, predetermined selections and the main content; and
   displaying the alternative content to the user, if the pause interval exceeds a predetermined length.

15. The method as claimed in claim 14, wherein accessing the source of alternative content comprises accessing the source of alternative content based upon indicator in the packets of the main content.

16. The method as claimed in claim 14, wherein accessing the source of alternative content further comprises accessing a local store of alternative content.

17. The method as claimed in claim 14, wherein accessing the source of alternative content further comprises accessing a remote store of alternative content, wherein the remote store is located on the cable network.

18. The method as claimed in claim 14, further comprising providing a user interface to the user and receiving a user preference for the source of alternative content.

* * * * *